United States Patent
Dunne et al.

(10) Patent No.: US 11,163,630 B2
(45) Date of Patent: Nov. 2, 2021

(54) USING REAL-TIME ANALYTICS TO MANAGE APPLICATION FEATURES

(71) Applicant: Dell Products L.P., Round Rock, TX (US)

(72) Inventors: Stephen Dunne, Dublin (IE); Morton Davis Nivers, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 16/656,934

(22) Filed: Oct. 18, 2019

(65) Prior Publication Data

US 2021/0117263 A1    Apr. 22, 2021

(51) Int. Cl.
| | |
|---|---|
| *G06F 11/00* | (2006.01) |
| *G06F 11/07* | (2006.01) |
| *G06F 11/36* | (2006.01) |
| *G06F 11/30* | (2006.01) |

(52) U.S. Cl.
CPC ........ *G06F 11/0772* (2013.01); *G06F 11/076* (2013.01); *G06F 11/0763* (2013.01); *G06F 11/0781* (2013.01); *G06F 11/302* (2013.01); *G06F 11/3636* (2013.01)

(58) Field of Classification Search
CPC ............. G06F 11/3664; G06F 11/3006; G06F 11/3055; G06F 11/0748; G06F 11/0751; G06F 11/0772; G06F 11/076; G06F 11/0781; G06F 11/302; G06F 11/3636; G06F 11/3612
See application file for complete search history.

(56) References Cited

U.S. PATENT DOCUMENTS

| | | | | |
|---|---|---|---|---|
| 6,718,489 B1* | 4/2004 | Lee | ...................... | G06F 11/0748 714/43 |
| 7,990,994 B1* | 8/2011 | Yeh | ...................... | H04L 12/4641 370/431 |
| 10,725,763 B1* | 7/2020 | Chud | ........................ | G06F 8/71 |
| 10,936,462 B1* | 3/2021 | Eardley | ............... | G06F 11/3466 |
| 2002/0184568 A1* | 12/2002 | Kurrasch | ............ | H04L 41/0681 714/39 |
| 2004/0236820 A1* | 11/2004 | Flocken | .............. | G06F 11/0748 709/200 |
| 2005/0240792 A1* | 10/2005 | Sicola | ................. | G06F 11/0751 714/1 |

(Continued)

*Primary Examiner* — Joseph D Manoskey
(74) *Attorney, Agent, or Firm* — Daly, Crowley, Mofford & Durkee, LLP

(57) ABSTRACT

A system and method for reducing execution errors make by a software service are disclosed. The service has several features whose execution paths are switched on or off by corresponding feature toggles, i.e. flags in a configuration database. The performance, and especially error generation, of each feature is monitored automatically and an instantaneous error rate is produced. When the error rate exceeds a given threshold error rate for a particular feature, the corresponding toggle is disabled in the configuration database and the service is triggered to restart using the updated toggles, thereby disabling the problematic feature. The system and method also determine whether the error rate increased due to a transient error condition, such as a data link drop or a secondary service restart, and re-enable the toggle when the error condition has passed.

17 Claims, 6 Drawing Sheets

(56) References Cited

U.S. PATENT DOCUMENTS

| | | | |
|---|---|---|---|
| 2005/0273521 A1* | 12/2005 | Patrick | H04L 67/10 709/246 |
| 2006/0005063 A1* | 1/2006 | Patrick | G06F 11/0772 714/1 |
| 2006/0218301 A1* | 9/2006 | O'Toole | H04L 12/185 709/244 |
| 2009/0204743 A1* | 8/2009 | Inoue | G06F 11/201 711/100 |
| 2009/0245120 A1* | 10/2009 | Jones | H04L 12/413 370/252 |
| 2011/0119219 A1* | 5/2011 | Naifeh | H04L 41/0631 706/47 |
| 2011/0126059 A1* | 5/2011 | Klein | H04L 41/5035 714/47.1 |
| 2012/0249626 A1* | 10/2012 | Asada | G06Q 30/04 347/5 |
| 2013/0152047 A1* | 6/2013 | Moorthi | G06F 11/368 717/124 |
| 2013/0179565 A1* | 7/2013 | Hart | H04L 41/0893 709/224 |
| 2014/0003252 A1* | 1/2014 | Johannes | H04L 43/0823 370/242 |
| 2015/0257141 A1* | 9/2015 | Kulal | H04W 72/0406 370/329 |
| 2015/0381409 A1* | 12/2015 | Margalit | H04L 41/0631 709/221 |
| 2016/0132373 A1* | 5/2016 | Yoshinaga | G06N 7/005 714/28 |
| 2016/0227422 A1* | 8/2016 | Partheniou | H04L 41/0604 |
| 2018/0004507 A1* | 1/2018 | Aijaz | G06F 8/71 |
| 2018/0004596 A1* | 1/2018 | Zhang | G06F 11/1048 |
| 2019/0339688 A1* | 11/2019 | Cella | G05B 19/41865 |

* cited by examiner

USING REAL-TIME ANALYTICS TO MANAGE APPLICATION FEATURES

FIELD

The disclosure pertains generally to error detection, correction, and monitoring using electric digital data processing, and more particularly to fault tolerance not based on redundancy in a distributed client-server system.

BACKGROUND

Feature toggles (also known as feature flags) are a design technique in software development by which the execution (or not) of certain features by a software program is controlled by certain variables that may be read from a configuration file or database. Feature toggles are useful for testing experimental features just added to a mature program, because the features can be switched on or off without changing the design of the program or its program code. However, testing in a sandbox or quality control (QC) environment often fails to find errors in experimental features that only manifest themselves under the greater and wider variety of usage situations in a production or customer-facing environment, that itself is administratively controlled to prevent easy modification.

SUMMARY OF DISCLOSED EMBODIMENTS

Disclosed embodiments of the concepts, structures, and techniques herein provide an automatic control for disabling, based on a heuristic, features that experience too many errors in a production environment. A production environment includes multiple programs and produces a logging stream that is actively monitored by support software for the occurrence of errors that are associated with various features. When an unacceptable level of errors has been detected based on the heuristic for a particular feature, the support software automatically updates the configuration file or database to disable the problematic feature, then causes the program to reload its configuration. Advantageously, this process occurs immediately once the error heuristic conditions are met, and therefore does not require administrative intervention. No further software deployment is required, minimizing down time. And errors in a customer-facing service are also minimized, improving customer experience with the program. In this way, the behavior and operation of the computer system(s) of the production environment are improved, in that errors produced by services executing on those systems are minimized.

Thus, a first embodiment is a method of reducing execution errors made by a software service, the software service having a plurality of execution paths whose accessibility for execution is controlled by a corresponding plurality of configuration flags loaded from a database. The method includes receiving, from the software service by a service monitor, a stream of logging data including error data. The method then includes detecting, by the service monitor, an interval of time in which a given error rate threshold is exceeded by the ratio between (a) the number of errors in the logging data for any one of the accessible execution paths during the interval and (b) the duration of the interval. The method further includes, in response to detecting the interval, the service monitor causing storage, in the database, of a configuration flag for the one of the accessible execution paths; and causing the software service to be notified that the configuration has changed, the software service responsively reloading the plurality of configuration flags from the database, whereby the one of the accessible execution paths becomes inaccessible for subsequent execution by the software service without changing code of the software service.

In some embodiments, the software service is a web service.

In some embodiments, detecting by the service monitor includes detecting by a plurality of feature monitors corresponding to the plurality of execution paths, the plurality of feature monitors executing concurrently.

In some embodiments, the given error rate threshold comprises a plurality of error rate thresholds corresponding to the plurality of execution paths.

In some embodiments, the real-time error data includes, for each error, an error level in a plurality of error levels, and wherein the given error rate threshold comprises a plurality of error rate thresholds corresponding to the plurality of error levels.

In some embodiments, the stream of logging data includes real-time non-error logging data as a function of time.

Some embodiments further include re-enabling the failing feature after a transient error has passed. Such embodiments include determining, by the monitoring service, that the detecting was caused by a transient error. Such embodiments also include, after responsively waiting until the transient error has passed, the monitoring service: causing storage, in the database, of a configuration flag for the one of the accessible execution paths; and causing the software service to be notified that the configuration has changed, the software service responsively reloading the plurality of configuration flags from the database, whereby the inaccessible execution path becomes accessible for subsequent execution by the software service without changing code of the software service.

In some embodiments, the transient error is a hardware error, or a software error, or a data communications error.

A second embodiment is a tangible, computer-readable storage medium, in which is non-transitorily stored computer program code for performing any of the above-described embodiments.

A third embodiment is a system for reducing execution errors made by a software service, the software service having a plurality of execution paths whose accessibility for execution is controlled by a corresponding plurality of configuration flags loaded from a database. The system includes a service monitor having (a) a plurality of feature monitors corresponding to the plurality of execution paths and (b) an error filter for forwarding errors logged in a stream of logging data, received from the software service, to the feature monitor corresponding to the execution path that generated the errors.

In the system, each feature monitor has a number of functional components, that may be implemented in hardware, or a combination of hardware and software. A first such component is an error counter for counting a number of the forwarded errors. A second such component is an interval timer for timing an interval over which the forwarded errors occurred. A third such component is a divider for dividing the number by the interval to thereby form an error rate. A fourth such component is a comparator for comparing the error rate to an error rate threshold. A fifth such component is a flag updater for, when the error rate exceeds the error rate threshold: causing storage, in the database, of a configuration flag for the corresponding execution path; and causing the software service to be notified that the configuration has changed, the software service responsively reloading the plurality of configuration flags from the database, whereby the one of the accessible execution paths becomes inaccessible for subsequent execution by the software service without changing code of the software service.

In some embodiments of the system, the feature monitors in the plurality of feature monitors execute concurrently.

In some embodiments of the system, the real-time error data includes, for each error, an error level in a plurality of error levels, and the error rate threshold for at least one feature monitor comprises a plurality of error rate thresholds corresponding to the plurality of error levels, and the error counter for the at least one feature monitor comprises a plurality of error counters, each such error counter for counting a number of the forwarded errors having a corresponding error level.

In some embodiments of the system at least one feature monitor comprises a transient detector for determining that the error rate exceeds the error rate threshold due to a transient condition; and a delay element for waiting until the transient error has passed, then signaling the flag updater for causing storage, in the database, of a configuration flag for the one of the accessible execution paths, and for causing the software service to be notified that the configuration has changed, the software service responsively reloading the plurality of configuration flags from the database, whereby the inaccessible execution path becomes accessible for subsequent execution by the software service without changing code of the software service.

DESCRIPTION OF THE SEVERAL VIEWS OF THE DRAWINGS

The manner and process of making and using the disclosed embodiments may be appreciated by reference to the drawings, in which.

DETAILED DESCRIPTION

Figure 1:
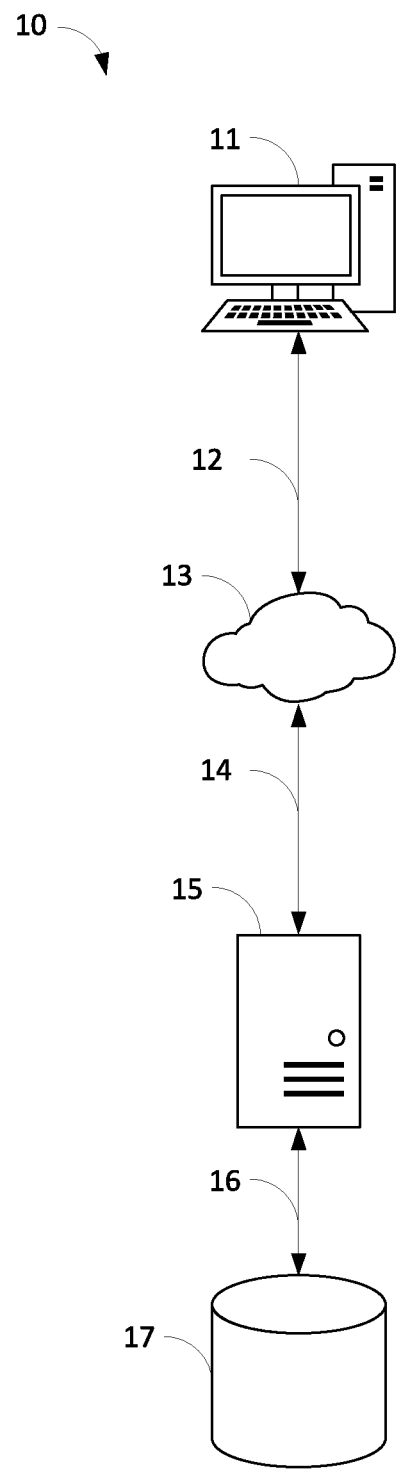
FIG. 1 schematically shows a typical client-server system in which the disclosed concepts, structures, and techniques may be advantageously embodied.

FIG. 1 schematically shows a typical client-server system in which the disclosed concepts, structures, and techniques may be advantageously embodied. In accordance with client-server principles, the system 10 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 10 includes a client device 11. The client device 11 is illustrated as a desktop computer, but may be any electronic device known in the art, including without limitation a laptop computer, tablet computer, smartphone, embedded system, or any other device capable of transmitting and receiving data, and requesting that another electronic device perform a computation.

The client device 11 is coupled, via a data link 12, to a data network 13. The data link 12 is any combination of hardware or software suited for communicating data between the client device 11 and other electronic devices via the data network 13. The data link 12 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data network 13 is any combination of hardware or software suited for communicating data between electronic devices via data links. The data network 13 may be, for example, a local area network ("LAN"), a wide area network ("WAN"), a metropolitan area network ("MAN"), a virtual private network ("VPN"), the Internet, or any other type of data network.

It is appreciated that a data network 13 operates to mediate data communication between multiple electronic devices. Thus, the depiction of only a single client device 11 in FIG. 1 is merely illustrative, and a typical system 10 may have any number of client devices coupled for data communication using corresponding data links to the data network 13. It is also appreciated that the data network 13 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data network 13 allows the client device 11 to communicate with a server device 15, which is coupled to the data network 13 using a data link 14. The data link 14 is any combination of hardware or software suited for communicating data between the server device 15 and other electronic devices via the data network 13. The server device 15 may be any electronic device known in the art that is capable of transmitting and receiving data, and performing a computation on behalf of another electronic device.

Again, the data network 13 operates to mediate data communication between multiple electronic devices. Thus, the depiction of only a single server device 15 in FIG. 1 is merely illustrative, and a typical system 10 may have any number of server devices coupled for data communication using corresponding data links to the data network 13. In particular, to provide simultaneous service to large numbers of client devices, a particular computation (or type of computation, such as rendering a web page) may be allocated to one of multiple server devices using a load balancer or other device.

It is further appreciated that the server device 15, along with additional server devices if required, may provide well-defined operations known as "services" according to a service-oriented architecture ("SOA"), as those terms are known in the art. One illustrative service is a web service that receives requests from a client device 11 for web pages using a uniform resource locator ("URL"), and responsively creates and returns a web page to the client device 11. As is known in the art such a web service may use other services in the SOA to form the web page. For example, the web service might use authentication data sent from the client device 11 to access private data using a subordinate security service.

It is appreciated in accordance with client-server principles that the designation of device 11 as the "client device" and device 15 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 10, namely that the client device 11 is the device requesting that a particular computation be performed on behalf of a user thereof, and that the server device 15 operates a "service" to perform the computation and communicate the results to the client device 11. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 1 shows the server device 15 coupled, via a storage link 16, to a data storage device 17. The data storage device 17 may be a database, file system, volatile or non-volatile memory, network attached storage ("NAS"), storage area network ("SAN"), or any other hardware or software that is capable of storing data used by a server device 15 or a service executing thereon. The storage link 16 may be any hardware or software capable of communicating data between the server device 15 and the data storage device 17. It is appreciated that, where more than one server device 15 is present, multiple server devices may communicate with the same data storage device 17 to provide data sharing between the server devices.

It is appreciated that a requested computation may be done in several parts, thereby requiring the system 10 to retain an intermediate computational state between requests. If the services provided by the server device 15 do not store any such state (for example, to simplify their design), then the client device 11 must supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require client devices to perform some computation locally to improve performance; and provide a uniform interface for all client devices.

Figure 2:
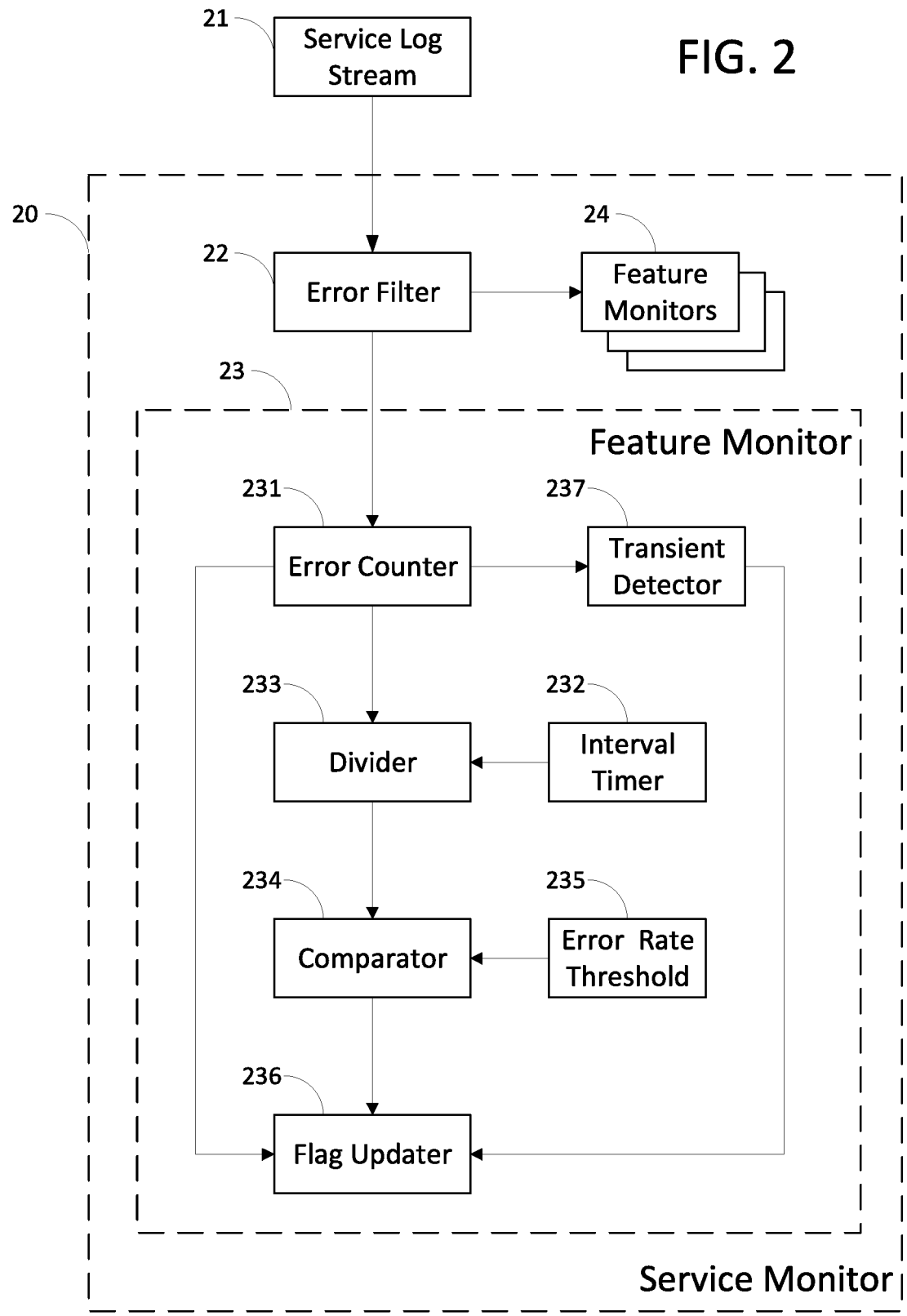
FIG. 2 schematically shows relevant components of an embodiment, and their respective relationships.

FIG. 2 schematically shows relevant components of a service monitor 20 in accordance with an embodiment of the concepts, structures, and techniques disclosed herein. The service monitor 20 operates to monitor and control a service. The service may be executing in the system 10 on the server device 15, for example. The service monitor 20 itself may be hardware, or a combination of hardware and software, that forms part of the server device 15, or forms part of another server device (not shown). That is, embodiments do not depend on the service monitor 20 executing its functions on a particular device. However, embodiments do both monitor, and control, a given service that is executing on a known device (or devices) to thereby improve the operation of the given service.

The service monitor 20 receives a service log stream 21 as its input. The service log stream 21 is a stream of logging data, as known in the art, that is generated by the service to be controlled, and permits the service monitor 20 to monitor the service. The logging data are generated by different features (i.e. different functional components having different execution paths) within the service, and each entry in the stream includes data that indicate the feature that generated the entry (e.g. by a feature identifier supplied by the feature designer). Each entry may further include data that indicate a "level", severity, or importance of the entry to a person or automated software monitoring the stream. For example, common log levels in increasing order of impact on service or feature performance are TRACE, DEBUG, INFO, WARN, ERROR, and CRITICAL.

The service monitor 20 includes one or more feature monitors 23, 24 and an error filter 22. The error filter 22 operates on the service log stream 21 as a demultiplexer, forwarding errors in the stream that pertain to a particular feature to a corresponding one of the feature monitors 23, 24. That is, each of the feature monitors 23, 24 operates to monitor and control a single feature of the service, and the error filter 22 directs to a particular feature monitor only those data relevant to its corresponding feature.

It should be understood in this context that the word "error" does not necessarily mean an error in the design or execution of the service or feature, but rather pertains to a behavior of the service or feature that triggers corrective intervention by a service monitor 20, or other embodiment of the concepts, structures, and techniques disclosed herein, because it may be detrimental to an end user experience. In particular, an "error" in such behavior does not necessarily result in generation of a log entry having a level of ERROR, but may result in log entries having other levels, e.g. WARN. Thus, in various embodiments, the stream of logging data includes real-time non-error entries in addition to entries that indicate an error potentially requiring intervention.

In some embodiments, the error filter 22 further forwards only log entries that have a level greater than a given threshold. That is, if the given threshold begins with warning-type log entries, entries that pertain to routine operation of the feature (e.g. having levels TRACE, DEBUG, or INFO) may not be forwarded, while log entries that indicate abnormal operation (e.g. having levels WARN, ERROR, or CRITICAL) may be forwarded. The dividing threshold between such log levels is a matter of choice by the designer of the service monitor 20, and should not be viewed as limiting the scope of embodiments. Thus, in some embodiments the error filter 22 may forward only log entries that are ERROR or CRITICAL, for example.

It is appreciated that FIG. 2 is merely illustrative, in that other embodiments may include more or fewer feature monitors, and feature monitors that monitor multiple features within a single service. It is further appreciated that the service monitor 20 has a modular design, and that the feature monitors 23, 24 of a single service monitor 20 may execute concurrently across multiple server devices, or within the same server device.

The structure and operation of a particular feature monitor 23 is now described in detail. The structure and operation of the other feature monitors 24 are identical, although as may be understood from the concepts, structures, and techniques described herein, other feature monitors 24 may be configured differently than the feature monitor 23, and therefore have different quantitative or qualitative behavior. In particular, different feature monitors may trigger a disabling intervention according to different error thresholds or error rate thresholds.

The feature monitor 23 is associated with a particular one or more features of the service being monitored, and receives from the error filter 22 errors associated with those features. For simplicity of description, in what follows the feature monitor 23 will be associated with a single feature and errors having a log level at least WARN, however such description should not be taken to limit the scope of embodiments.

The feature monitor 23 operates to disable the service feature when the feature has generated or is generating too many errors according to a heuristic. The heuristic may be, for example, that the feature has generated too many error behaviors over the entire time it has been deployed. Alternately, the heuristic may be that the feature is currently generating too many error behaviors per unit of time; that is, an error rate is higher than a given threshold. It is appreciated that other heuristics may be used in accordance with the concepts, structures, and teachings disclosed herein.

In some embodiments, the feature monitor 23 also operates to reenable the service feature if the heuristic is a function of time, and it can be determined that a condition causing an abnormally high error rate is transient. In such cases, the feature monitor 23 delays reenabling the service feature until it detects that the transient condition has passed.

Thus, the feature monitor 23 includes an error counter 231 for counting a number of the forwarded errors. The error counter 231 may be, for example, a register, accumulator, or other memory device. In some embodiments, the error counter 231 counts a number of forwarded errors according to the log level, and thus may be viewed as multiple error counters. That is, the error counter 231 may count WARN log entries separately from ERROR log entries.

The feature monitor 23 further includes an interval timer 232 for timing an interval over which the forwarded errors occurred. The interval timer 232 may be, for example, an oscillator coupled to an accumulator, or similar device known in the art for timing intervals.

The feature monitor 23 also includes a divider 233 for dividing the number by the interval to thereby form an error rate. The divider 233 may comprise, for example, an arithmetic logic unit ("ALU"), or other circuit known in the art for performing mathematical operations. In embodiments where errors are counted according to log level, the divider 233 produces an error rate for each corresponding log level.

The feature monitor 23 includes a comparator 234 for comparing the error rate to an error rate threshold 235. The error rate threshold 235 may be configured on a per-feature basis, thereby affecting the qualitative and quantitative performance and operation of the feature monitor 23, and may be stored in any kind of memory, for example volatile memory. The comparator 234 determines whether and when the error rate exceeds the error rate threshold 235, and may be implemented as any mathematical comparator, e.g. in an ALU.

In embodiments where errors are counted according to log level, the comparator 234 compares the error rate for each log level to a corresponding error rate threshold 235. That is, in such embodiments there are multiple error rate thresholds 235 that may be the same or may be different depending on the severity of the error condition. In this way, embodiments may determine that intervention is required after a smaller error rate of more severe errors, or a larger error rate for less severe errors, or a combination of both. Such a combination might include, for example, using a heuristic in which exceeding an error rate threshold 235 for a less severe condition indicates the potential for a more severe problem, at which time the feature monitor 23 activates a second error rate threshold 235 at a higher level to detect whether the problem is tolerable or whether the feature should be disabled.

The feature monitor 23 includes a flag updater 236. When the comparator 234 determines that the error rate exceeds the error rate threshold 235, it signals the flag updater 236 to cause two events to occur to disable the feature in the service being monitored. Recall that the service uses feature toggles or flags that are stored in a configuration database to indicate whether or not to execute a path through the service program code. The first event caused by the flag updater 236 is storage, in the configuration database, of a configuration flag for the execution path corresponding to the feature monitored by feature monitor 32. The second event caused by the flag updater 236 is notifying the software service that the configuration has changed. In response to the second event, the software service reloads its configuration flags from the database, including the flag disabling the feature monitored by feature monitor 32. In this way, the execution path for the feature becomes inaccessible for subsequent execution by the software service. Advantageously, these operations are performed without changing the program code of the software service.

The flag updater 236 need not directly store an updated toggle or flag in the configuration database, or notify the service to reload its flags. Rather, some embodiments may have an administrative service for manually toggling features that is used in conjunction with the concepts, structures, and techniques described herein. Such an admin service may be used, for example, by software managers to activate and deactivate different features within a production environment. The admin service may be used as a single point of access for writing toggles to the configuration database and for notifying services to reload, for reasons of security. The admin service may have an application programming interface ("API") that permits programmatic access to its functions without compromising security requirements. Thus, while the flag updater 236 causes the flags to be updated, and causes the relevant service to reload its configuration, in some embodiments it accomplishes these processes by contacting a separate administrative service. Notifying the software service may be performed using techniques known in the art, e.g. through the use of event messages sent across a data communication network and an event handler executing in the service being monitored.

The structures of the feature monitor 23 just described may be used for modes of operation other than disabling the corresponding feature when the error rate exceeds a given error rate threshold. Thus, as mentioned above, the feature may be disabled when it has generated too many error behaviors over the entire time it has been deployed. In this mode of operation, when the error counter 231 has counted enough error behaviors, it directly signals the flag updater 236 to disable the feature, as indicated by the arrow from the error counter 231 to the flag updater 236.

As mentioned above, the feature monitor 23 in some embodiments also operates to reenable the service feature when it detects that an error rate is above the error rate threshold due to a transient condition. Such embodiments include a transient detector 237 that detects transient conditions. The transient condition may be a hardware condition (e.g. server restarting), or a software error (e.g. service or feature restarting), or a data communications error (e.g. data link temporarily taken offline), and the design and operation of the transient detector 237 depends on the particular type and characteristics of the transient conditions detected.

The transient detector 237 operates in two phases. In a first phase, it detects that a transient error condition has occurred. In the second phase, it detects that the transient error condition has passed. After the second phase, the transient detector 237 signals the flag updater 236 to reenable the feature previously disabled by the feature monitor 23. That is, the flag updater 236 causes the feature flag to be toggled in the configuration database, and causes the software service being monitored to reload its flags from the database. In this way, the execution path for the given feature is reenabled and becomes again accessible for subsequent execution by the service.

A person having ordinary skill in the art should understand how to detect transient conditions that cause errors, and to implement the transient detector 237. For example, if the error is transient because the configuration database is restarting or heavily loaded, the transient detector 237 may operate in the first phase by periodically requesting a dummy database access. When the access is successful, the transient detector 237 has determined that the database has completed restarting and the second phase may begin. In general, the feature monitor 23 may be designed to permit a software developer to install, as the transient detector 237 using known techniques, program code for detecting any transient condition conceived by the developer.

Figure 3:
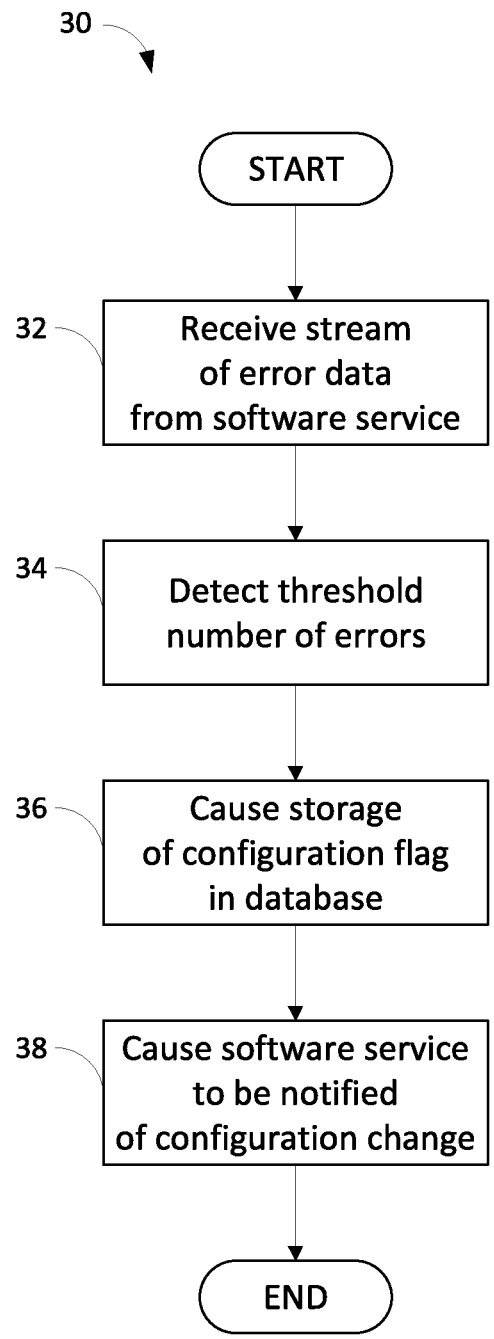
FIG. 3 is a flow diagram for a method according to an embodiment.

FIG. 3 is a flow diagram for a method 30 according to an embodiment. The method reduces execution errors in a software service, for example a service that may be executing on a server device 15. The service has multiple execution paths corresponding to various features implemented by the service. Accessibility for execution of each such path is controlled by a corresponding feature toggle (i.e. configuration flag) loaded by the service from a database.

The method 30 begins with a process 32 of receiving from the software service by a service monitor, a stream of logging data including error logging data, and potentially non-error logging data. The service monitor may be service monitor 20, and the stream of logging data may be, for example, the service log stream 21.

The method 30 continues with a process 34 of detecting, by the service monitor, a threshold number of errors for any one of the accessible execution paths (i.e. features). To implement process 34, the service monitor may direct errors for particular features using a filter, such as error filter 22, to individual feature monitors, such as feature monitor 23. In various embodiments, multiple feature monitors may execute concurrently, and errors may be counted for different log levels simultaneously, as described above.

In response to detecting the threshold number of errors, the method 30 continues with a process 36 of causing storage, in the database, of a disabling configuration flag for the relevant feature. That is, the process 36 toggles the flag (from enabled to disabled) in the database, while the service continues to execute.

Finally, the method 30 completes with a process 38 of causing the software service to be notified that the configuration has changed. The processes 36 and 38 may be performed, for example, by flag updater 236 upon direct signaling from error counter 231. In response to this notification, the software service reloads its configuration flags from the database, thereby disabling the feature.

Figure 4:
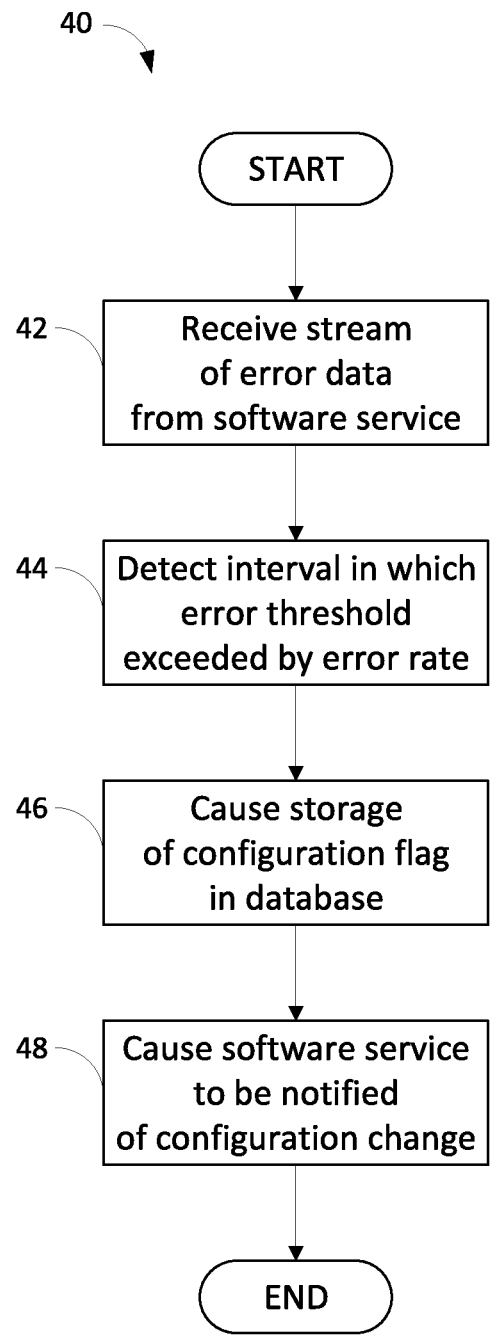
FIG. 4 is a flow diagram for a method according to another embodiment.

FIG. 4 is a flow diagram for a method 40 according to another embodiment. The method 40 shown in FIG. 4 is similar to that shown in FIG. 3, except that instead of detecting a fixed number of errors, a maximum acceptable error rate is detected.

Thus, the method 40 begins with a process 42 of receiving from the software service by a service monitor, a stream of logging data including error logging data, and potentially non-error logging data. The service monitor may be service monitor 20, and the stream of logging data may be, for example, the service log stream 21. The process 42 may be identical to the process 32 described above.

The method 40 continues with a process 44 of detecting, by the service monitor, an interval of time in which a given error rate threshold is exceeded. The error rate is calculated as the ratio between (a) the number of errors in the logging data for any one of the accessible execution paths during the interval and (b) the duration of the interval. To implement process 44, the service monitor may direct errors for particular features using a filter, such as error filter 22, to individual feature monitors, such as feature monitor 23. Each feature monitor, in turn, may use an error counter, interval timer, divider, and comparator (such as elements 231 through 234) to determine whether the threshold is exceeded. In various embodiments, multiple feature monitors may execute concurrently, and errors may be counted for different log levels simultaneously, as described above.

In response to detecting the threshold number of errors, the method 40 continues with a process 46 of causing storage, in the database, of a disabling configuration flag for the relevant feature. That is, the process 46 toggles the flag (from enabled to disabled) in the database, while the service continues to execute. The process 46 may be identical to the process 36 described above.

Finally, the method 40 completes with a process 48 of causing the software service to be notified that the configuration has changed. The processes 46 and 48 may be performed, for example, by flag updater 236. In response to this notification, the software service reloads its configuration flags from the database, thereby disabling the feature. The process 48 may be identical to the process 38 described above.

Figure 5:
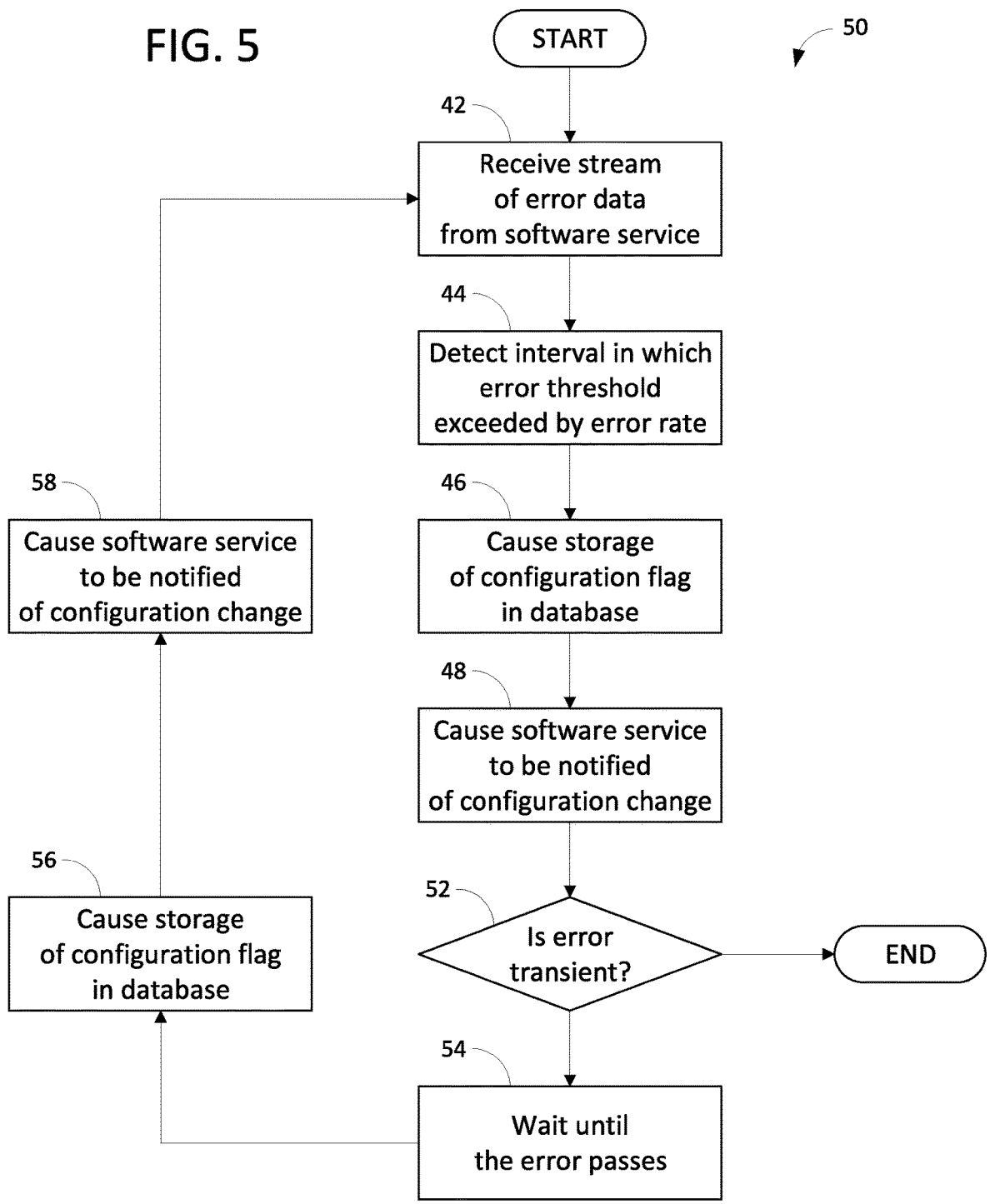
FIG. 5 is a flow diagram for a method according to yet another embodiment.

FIG. 5 is a flow diagram for a method 50 according to yet another embodiment. The method 50 shown in FIG. 5 continues from the end of that shown in FIG. 4, except that instead of terminating after disabling the feature by toggling its configuration flag, the method 50 continues to determine whether the error rate was due to a transient condition, and to reenable the feature after that condition has passed. Thus, the method 50 includes the first four processes 42, 44, 46, 48 of the method 40 of FIG. 4.

The method 50 continues past the end of the method 40 by a process 52 of determining whether the error is transient. The process 52 may be performed, for example, by a transient detector, such as transient detector 237. If the error is not transient, then the method 50 ends with the same effect as the method 40 of FIG. 4. However, if the error is transient, then the method 50 continues in a process 54 to wait until the error condition passes.

Next, in a process 56 the method 50 causes storage, in the configuration database, of an enabling configuration flag for the relevant feature. That is, the process 56 toggles the flag (from disabled to enabled) in the database, while the service continues to execute. The process 56 may be identical to the process 36 or the process 46 described above.

Then, the method 50 continues with a process 58 of causing the software service to be notified that the configuration has changed. The processes 56 and 58 may be performed, for example, by flag updater 236. In response to this notification, the software service reloads its configuration flags from the database, thereby reenabling the feature. The process 58 may be identical to the process 38 or the process 48 described above.

As the software service now has reenabled the feature being monitored, it is possible that the feature may once again begin to experience errors. In particular, the transient condition that caused the service monitor to intervene may recur. Thus, the method 50 concludes by returning to its beginning, once again executing the process 42 in preparation for further interventions.

Figure 6:
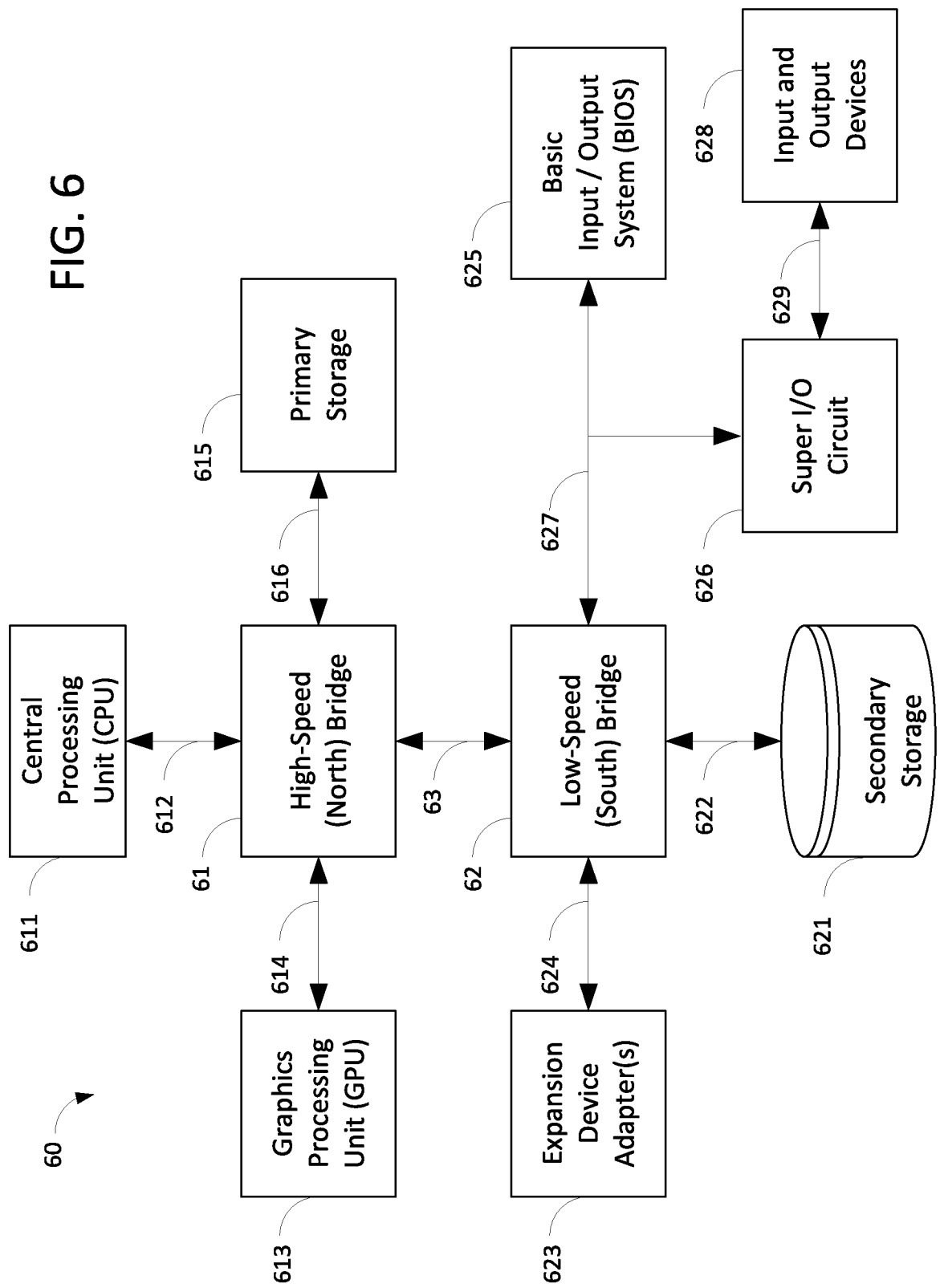
FIG. 6 schematically shows relevant physical components of a computer processing system that may be used in embodiments of the concepts, structures, and techniques disclosed herein.

FIG. 6 schematically shows relevant physical components of a computer 60 that may be used in embodiments of the concepts, structures, and techniques disclosed herein. For example, the client device 11, the server device 15, the server monitor 20, the feature monitors 23, 24, or any of their functional components may be implemented, in whole or in part, using the computer 60. Generally, the computer 60 has many functional components that communicate data with each other using data buses. The functional components of FIG. 6 are physically arranged based on the speed at which each must operate, and the technology used to communicate data using buses at the necessary speeds to permit such operation.

Thus, the computer 60 is arranged as high-speed components and buses 611-616 and low-speed components and buses 621-629. The high-speed components and buses 611-616 are coupled for data communication using a high-speed bridge 61, also called a "northbridge," while the low-speed components and buses 621-629 are coupled using a low-speed bridge 62, also called a "southbridge."

The computer 60 includes a central processing unit ("CPU") 611 coupled to the high-speed bridge 61 via a bus 612. The CPU 611 is electronic circuitry that carries out the instructions of a computer program. As is known in the art, the CPU 611 may be implemented as a microprocessor; that is, as an integrated circuit ("IC"; also called a "chip" or "microchip"). In some embodiments, the CPU 611 may be implemented as a microcontroller for embedded applications, or according to other embodiments known in the art.

The bus 612 may be implemented using any technology known in the art for interconnection of CPUs (or more particularly, of microprocessors). For example, the bus 612 may be implemented using the HyperTransport architecture developed initially by AMD, the Intel QuickPath Interconnect ("QPI"), or a similar technology. In some embodiments, the functions of the high-speed bridge 61 may be implemented in whole or in part by the CPU 611, obviating the need for the bus 612.

The computer 60 includes one or more graphics processing units (GPUs) 613 coupled to the high-speed bridge 61 via a graphics bus 614. Each GPU 613 is designed to process commands from the CPU 611 into image data for display on a display screen (not shown). In some embodiments, the CPU 611 performs graphics processing directly, obviating the need for a separate GPU 613 and graphics bus 614. In other embodiments, a GPU 613 is physically embodied as an integrated circuit separate from the CPU 611 and may be physically detachable from the computer 60 if embodied on an expansion card, such as a video card. The GPU 613 may store image data (or other data, if the GPU 613 is used as an auxiliary computing processor) in a graphics buffer.

The graphics bus 614 may be implemented using any technology known in the art for data communication between a CPU and a GPU. For example, the graphics bus 614 may be implemented using the Peripheral Component Interconnect Express ("PCI Express" or "PCIe") standard, or a similar technology.

The computer 60 includes a primary storage 615 coupled to the high-speed bridge 61 via a memory bus 616. The primary storage 615, which may be called "main memory" or simply "memory" herein, includes computer program instructions, data, or both, for use by the CPU 611. The primary storage 615 may include random-access memory ("RAM"). RAM is "volatile" if its data are lost when power is removed, and "non-volatile" if its data are retained without applied power. Typically, volatile RAM is used when the computer 60 is "awake" and executing a program, and when the computer 60 is temporarily "asleep", while non-volatile RAM ("NVRAM") is used when the computer 60 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 616 may be implemented using any technology known in the art for data communication between a CPU and a primary storage. The memory bus 616 may comprise an address bus for electrically indicating a storage address, and a data bus for transmitting program instructions and data to, and receiving them from, the primary storage 615. For example, if data are stored and retrieved 64 bits (eight bytes) at a time, then the data bus has a width of 64 bits. Continuing this example, if the address bus has a width of 32 bits, then 232 memory addresses are accessible, so the computer 60 may use up to $8*2^{32}=32$ gigabytes (GB) of primary storage 615. In this example, the memory bus 616 will have a total width of 64+32=96 bits. The computer 60 also may include a memory controller circuit (not shown) that converts electrical signals received from the memory bus 616 to electrical signals expected by physical pins in the primary storage 615, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 611, the graphics processing units 613, the primary storage 615, and the high-speed bridge 61, or any combination thereof, as a single integrated circuit. In such embodiments, buses 612, 614, 616 may form part of the same integrated circuit and need not be physically separate. Other designs for the computer 60 may embody the functions of the CPU 611, graphics processing units 613, and the primary storage 615 in different configurations, obviating the need for one or more of the buses 612, 614, 616.

The depiction of the high-speed bridge 61 coupled to the CPU 611, GPU 613, and primary storage 615 is merely exemplary, as other components may be coupled for communication with the high-speed bridge 61. For example, a network interface controller ("NIC" or "network adapter") may be coupled to the high-speed bridge 61, for transmitting and receiving data using a data channel. The NIC may store data to be transmitted to, and received from, the data channel in a network data buffer.

The high-speed bridge 61 is coupled for data communication with the low-speed bridge 62 using an internal data bus 63. Control circuitry (not shown) may be required for transmitting and receiving data at different speeds. The internal data bus 63 may be implemented using the Intel Direct Media Interface ("DMI") or a similar technology.

The computer 60 includes a secondary storage 621 coupled to the low-speed bridge 62 via a storage bus 622. The secondary storage 621, which may be called "auxiliary memory", "auxiliary storage", or "external memory" herein, stores program instructions and data for access at relatively low speeds and over relatively long durations. Since such durations may include removal of power from the computer 60, the secondary storage 621 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 622 may be implemented using any technology known in the art for data communication between a CPU and a secondary storage and may include a host adaptor (not shown) for adapting electrical signals from the low-speed bridge 62 to a format expected by physical pins on the secondary storage 621, and vice versa. For example, the storage bus 622 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 60 also includes one or more expansion device adapters 623 coupled to the low-speed bridge 62 via a respective one or more expansion buses 624. Each expansion device adapter 623 permits the computer 60 to communicate with expansion devices (not shown) that provide additional functionality. Such additional functionality may be provided on a separate, removable expansion card, for example an additional graphics card, network card, host adaptor, or specialized processing card.

Each expansion bus 624 may be implemented using any technology known in the art for data communication between a CPU and an expansion device adapter. For example, the expansion bus 624 may transmit and receive electrical signals using a Peripheral Component Interconnect ("PCI") standard, a data networking standard such as an Ethernet standard, or a similar technology.

The computer 60 includes a basic input/output system ("BIOS") 625 and a Super I/O circuit 626 coupled to the low-speed bridge 62 via a bus 627. The BIOS 625 is a non-volatile memory used to initialize the hardware of the computer 60 during the power-on process. The Super I/O circuit 626 is an integrated circuit that combines input and output ("I/O") interfaces for low-speed input and output devices 628, such as a serial mouse and a keyboard. In some embodiments, BIOS functionality is incorporated in the Super I/O circuit 626 directly, obviating the need for a separate BIOS 625.

The bus 627 may be implemented using any technology known in the art for data communication between a CPU, a BIOS (if present), and a Super I/O circuit. For example, the bus 627 may be implemented using a Low Pin Count ("LPC") bus, an Industry Standard Architecture ("ISA") bus, or similar technology. The Super I/O circuit 626 is coupled to the I/O devices 628 via one or more buses 629. The buses 629 may be serial buses, parallel buses, other buses known in the art, or a combination of these, depending on the type of I/O devices 628 coupled to the computer 60.

The techniques and structures described herein may be implemented in any of a variety of different forms. For example, features may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features are grouped together in one or more individual embodiments for the purpose of streamlining the disclosure. This method of disclosure is not to be interpreted as reflecting an intention that the claims require more features than are expressly recited. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of reducing execution errors made by a software service, the software service having a plurality of execution paths whose accessibility for execution is controlled by a corresponding plurality of configuration flags loaded from a database, the method comprising:
   receiving, from the software service by a service monitor, a stream of logging data including error data that include, for each error, an error level in a plurality of error levels;
   detecting, by the service monitor, an interval of time in which a given error rate threshold is exceeded by the ratio between (a) the number of errors in the logging data for any one of the accessible execution paths during the interval and (b) the duration of the interval, wherein the given error rate threshold comprises a plurality of error rate thresholds corresponding to the plurality of error levels; and
   in response to detecting the interval, the service monitor:
      causing storage, in the database, of a configuration flag for the one of the accessible execution paths; and
      causing the software service to be notified that the configuration has changed, the software service responsively reloading the plurality of configuration flags from the database, whereby the one of the accessible execution paths becomes inaccessible for subsequent execution by the software service without changing code of the software service.

2. The method according to claim 1, wherein the software service is a web service.

3. The method according to claim 1, wherein detecting by the service monitor includes detecting by a plurality of feature monitors corresponding to the plurality of execution paths, the plurality of feature monitors executing concurrently.

4. The method according to claim 1, wherein the given error rate threshold comprises a plurality of error rate thresholds corresponding to the plurality of execution paths.

5. The method according to claim 1, wherein the stream of logging data includes real-time non-error logging data as a function of time.

6. The method according to claim 1, further comprising:
    determining, by the monitoring service, that the detecting was caused by a transient error; and
    after responsively waiting until the transient error has passed, the monitoring service:
        causing storage, in the database, of a configuration flag for the one of the accessible execution paths; and
        causing the software service to be notified that the configuration has changed, the software service responsively reloading the plurality of configuration flags from the database, whereby the inaccessible execution path becomes accessible for subsequent execution by the software service without changing code of the software service.

7. The method according to claim 6, wherein the transient error is a hardware error, or a software error, or a data communications error.

8. A non-transitory computer-readable storage medium, in which is stored computer program code for performing a method of reducing execution errors made by a software service, the software service having a plurality of execution paths whose accessibility for execution is controlled by a corresponding plurality of configuration flags loaded from a database, the method comprising:
    receiving, from the software service by a service monitor, a stream of logging data including error data that include, for each error, an error level in a plurality of error levels;
    detecting, by the service monitor, an interval of time in which a given error rate threshold is exceeded by the ratio between (a) the number of errors in the logging data for any one of the accessible execution paths during the interval and (b) the duration of the interval, wherein the given error rate threshold comprises a plurality of error rate thresholds corresponding to the plurality of error levels; and
    in response to detecting the interval, the service monitor:
        causing storage, in the database, of a configuration flag for the one of the accessible execution paths; and
        causing the software service to be notified that the configuration has changed, the software service responsively reloading the plurality of configuration flags from the database, whereby the one of the accessible execution paths becomes inaccessible for subsequent execution by the software service without changing code of the software service.

9. The storage medium according to claim 8, wherein the software service is a web service.

10. The storage medium according to claim 8, wherein detecting by the service monitor includes detecting by a plurality of feature monitors corresponding to the plurality of execution paths, the plurality of feature monitors executing concurrently.

11. The storage medium according to claim 8, wherein the given error rate threshold comprises a plurality of error rate thresholds corresponding to the plurality of execution paths.

12. The storage medium according to claim 8, wherein the stream of logging data includes real-time non-error logging data as a function of time.

13. The storage medium according to claim 8, the method further comprising:
    determining, by the monitoring service, that the detecting was caused by a transient error; and
    after responsively waiting until the transient error has passed, the monitoring service:
        causing storage, in the database, of a configuration flag for the one of the accessible execution paths; and
        causing the software service to be notified that the configuration has changed, the software service responsively reloading the plurality of configuration flags from the database, whereby the inaccessible execution path becomes accessible for subsequent execution by the software service without changing code of the software service.

14. The storage medium according to claim 13, wherein the transient error is a hardware error, or a software error, or a data communications error.

15. A system for reducing execution errors made by a software service, the software service having a plurality of execution paths whose accessibility for execution is controlled by a corresponding plurality of configuration flags loaded from a database, the system comprising:
    a central processing unit (CPU); and
    a main memory storing computer program code that, when executed by the CPU, provides a service monitor having (a) a plurality of feature monitors corresponding to the plurality of execution paths and (b) an error filter for forwarding errors logged in a stream of logging data, received from the software service, to the feature monitor corresponding to the execution path that generated the errors, wherein the stream of logging data includes, for each error, an error level in a plurality of error levels;
    wherein each feature monitor comprises:
        an error counter for counting a number of the forwarded errors, wherein the error counter for at least one feature monitor comprises a plurality of error counters, each such error counter for counting a number of the forwarded errors having a corresponding error level;
        an interval timer for timing an interval over which the forwarded errors occurred;
        a divider for dividing the number by the interval to thereby form an error rate;
        a comparator for comparing the error rate to an error rate threshold, wherein the error rate threshold for the at least one feature monitor comprises a plurality of error rate thresholds corresponding to the plurality of error levels; and
        a flag updater for, when the error rate exceeds the error rate threshold:
            causing storage, in the database, of a configuration flag for the corresponding execution path; and
            causing the software service to be notified that the configuration has changed, the software service responsively reloading the plurality of configuration flags from the database, whereby the one of the accessible execution paths becomes inaccessible for subsequent execution by the software service without changing code of the software service.

16. The system according to claim 15, wherein the feature monitors in the plurality of feature monitors execute concurrently.

17. The system according to claim 15, wherein at least one feature monitor comprises:
- a transient detector for determining that the error rate exceeds the error rate threshold due to a transient condition, and for determining that the transient condition has passed;
- wherein after the transient condition has passed, the transient detector signals the flag updater for:
  - causing storage, in the database, of a configuration flag for the one of the accessible execution paths; and
  - causing the software service to be notified that the configuration has changed, the software service responsively reloading the plurality of configuration flags from the database, whereby the inaccessible execution path becomes accessible for subsequent execution by the software service without changing code of the software service.

\* \* \* \* \*